United States Patent
Török et al.

(10) Patent No.: US 10,508,914 B2
(45) Date of Patent: Dec. 17, 2019

(54) DEVICE FOR AUTOMATICALLY FINDING A MOBILE GEODETIC TARGET OBJECT

(71) Applicant: LEICA GEOSYSTEMS AG, Heerbrugg (CH)

(72) Inventors: Zoltán Török, Berneck (CH); Ulrich Hornung, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 539 days.

(21) Appl. No.: 15/418,715

(22) Filed: Jan. 28, 2017

(65) Prior Publication Data
US 2017/0219345 A1 Aug. 3, 2017

(30) Foreign Application Priority Data
Jan. 28, 2016 (EP) .................... 16153146

(51) Int. Cl.
*G01C 15/00* (2006.01)
*G01S 17/66* (2006.01)

(52) U.S. Cl.
CPC ............ *G01C 15/002* (2013.01); *G01S 17/66* (2013.01)

(58) Field of Classification Search
CPC ......... G01C 15/002; G01C 1/04; G01S 17/10; G01S 17/66
USPC ....................................................... 356/4.01
See application file for complete search history.

(56) References Cited

U.S. PATENT DOCUMENTS

| | | |
|---|---|---|
| 5,886,340 A | 3/1999 | Suzuki et al. |
| 6,035,254 A | 3/2000 | Nichols |
| 6,046,800 A | 4/2000 | Ohtomo et al. |
| 6,133,998 A | 10/2000 | Monz et al. |
| 6,433,858 B1 | 8/2002 | Suzuki |
| 6,504,602 B1 | 1/2003 | Hinderling |
| 6,734,952 B2 | 5/2004 | Benz et al. |
| 7,583,373 B2 | 9/2009 | Schwarz |
| 7,672,049 B2 | 3/2010 | Fruhmann et al. |
| 8,699,756 B2 | 4/2014 | Jensen |
| 2003/0169414 A1 | 9/2003 | Benz et al. |
| 2008/0316497 A1 | 12/2008 | Taketomi et al. |
| 2010/0245587 A1 | 9/2010 | Otani et al. |
| 2011/0013839 A1 | 1/2011 | Hue et al. |
| 2012/0014564 A1 | 1/2012 | Jensen |

(Continued)

FOREIGN PATENT DOCUMENTS

| | | |
|---|---|---|
| CN | 101900528 A | 12/2010 |
| CN | 103782132 A | 5/2014 |

(Continued)

OTHER PUBLICATIONS

European Search Report dated Jul. 29, 2016 as received in Application No. 16153146.2.

*Primary Examiner* — Daniel L Murphy
(74) *Attorney, Agent, or Firm* — Maschoff Brennan

(57) ABSTRACT

The invention relates to a surveying system for surveying and tracking a mobile target object which defines a target point, wherein the surveying system has a control and evaluation unit, a surveying device with a sighting device which defines a target axis, and a target object. The control and evaluation unit is designed to track the moving target object within the scope of a target-finding functionality, wherein a first change in alignment of the target axis about a first axis occurs as a function of detected target-finding radiation in such a way that the target axis tracks the movement tendency of the target object.

15 Claims, 6 Drawing Sheets

(56) References Cited

U.S. PATENT DOCUMENTS

| | | |
|---|---|---|
| 2012/0262728 A1 | 10/2012 | Bridges et al. |
| 2013/0093882 A1 | 4/2013 | Kotzur et al. |
| 2014/0350886 A1 | 11/2014 | Metzler |
| 2016/0349049 A1 | 12/2016 | Möller et al. |

FOREIGN PATENT DOCUMENTS

| | | |
|---|---|---|
| CN | 105026886 A | 11/2015 |
| DE | 197 10 722 A1 | 10/1997 |
| DE | 199 49 580 A1 | 4/2000 |
| EP | 1 081 459 A1 | 3/2001 |
| EP | 1 329 690 A1 | 7/2003 |
| EP | 1 662 278 A1 | 5/2006 |
| EP | 1 686 350 A1 | 8/2006 |
| EP | 2 219 011 A1 | 8/2010 |
| EP | 2 282 293 A1 | 2/2011 |
| EP | 2 405 236 A1 | 1/2012 |
| WO | 2011098127 A1 | 8/2011 |
| WO | 2014067579 A1 | 5/2014 |

DEVICE FOR AUTOMATICALLY FINDING A MOBILE GEODETIC TARGET OBJECT

FIELD OF THE INVENTION

The invention relates to devices and to a method for automatically finding a mobile geodetic target object. The invention also relates to an associated computer program product for carrying out the method according to the invention.

BACKGROUND

Since ancient times, numerous surveying devices have been known for surveying a target point. In this context, the direction and angle and usually also the distance from a surveying device to the target point to be surveyed have been recorded as spatial standard data, for example by means of laser radiation, and, in particular, the absolute position of the surveying device together with possibly present reference points has been detected.

Generally known examples of such surveying devices consist of theodolites, tachymeters and total stations, also referred to as an electronic tachymeter or computer tachymeter. A geodetic surveying device according to the prior art is described, for example, in the publication EP 1,686,350. Such devices have an electrosensory angle surveying function and, under certain circumstances, distance surveying function, which functions permit the direction and distance from a selected target to be determined. For the determination of the direction and distance, the devices generally have a radiation source for emitting surveying radiation such as e.g. laser radiation.

The angle variables or distance variables are ascertained here in the interior reference system of the device and under certain circumstances also have to be linked to an external reference system in order to determine absolute positions.

In many geodetic applications, target points are surveyed by positioning specially configured target objects there or mounting them on a mobile vehicle, e.g. a construction machine, with the result of a geodetic surveying system composed of a surveying device and a target object is obtained. Such a target object as a surveying aid instrument is composed, for example, of a retro-reflector (e.g. a 360° prism) which is mounted e.g. on a plumb staff and which retro-reflects laser radiation emitted by the total station. However, surveying systems which operate without a reflector are also possible, such as are described, for example in the European patent application with the application number EP 10168771.3.

In order to sight the target point to be surveyed, geodetic surveying devices of the generic type have a telescopic sight, such as e.g. an optical telescope, as a sighting or targeting device. The telescopic sight is generally rotatable about a vertical axis and about a horizontal tilting axis relative to a base of the surveying device, with the result that the telescopic sight can be aligned with the point to be surveyed by pivoting and tilting. Modern devices can have, in addition to the optical viewing channel, a camera for capturing an image, said camera being integrated into the telescopic sight and aligned, for example, coaxially or in parallel, wherein the captured image can be represented, in particular, as a live image on the display of the display control unit and/or on a display of the peripheral device—such as e.g. the data logger—which is used for remote control. In this context, the optical system of the targeting device can have a manual focus—for example an adjusting screw for changing the position of a focusing optical system—or an autofocus, wherein the focus position is changed e.g. by servomotors. For example, such a targeting device of a geodetic surveying device is described in European patent application No. 09152540.2. Automatic focusing devices for telescopic sights of geodetic devices are known e.g. from DE 197 107 22 or DE 199 495 80. For example, the design of generic telescopic sights of geodetic devices is presented in the publications EP 1 081 459 and EP 1 662 278.

Modern total stations have microprocessors for digital further processing and storage of acquired measurement data. The systems generally have a compact and integrated design, wherein usually coaxial distance surveying elements and computational units, control units and storage units, for example in the form of a control and evaluation unit, are present in a device. Depending on the level of expansion of the total station, it is additionally possible for motorization of the sighting and targeting device and—in the case where retro-reflectors (for example of a 360° prism) are used as target objects—means for automatic target finding and tracking to be integrated. The total station can have an electronic display control unit as a human/machine interface—generally a microprocessor computer unit with electronic data storage means—with display and input means, e.g. a keyboard. The measurement data which is acquired by electrosensory means is fed to the display control unit, with the result that the position of the target point can be ascertained, displayed visually and stored by means of the display control unit. Total stations which are known from the prior art can also have a radio data interface for establishing a radio link to external peripheral components, such as e.g. to a portable data acquisition device which can be embodied, in particular, as a data logger or field computer.

Surveying devices with a further expansion level have a fine-sighting unit and an automated target fine-sighting function or target-tracking function for prisms which serve as target reflectors (ATR: "Automatic Target Recognition"). For this, a separate ATR light source, e.g. a further laser source, for emitting an ATR measurement beam or fine-sighting beam and a large-area ATR detector (e.g. CCD large-area sensor) which is sensitive to the emission wavelength of this light source are jointly additionally integrated into the telescope.

Within the scope of the ATR fine-sighting function and ATR target-tracking function the ATR measurement beam is emitted here in the direction of the optical target axis of the targeting device. Said ATR measurement beam is retro-reflected, for example, at a 360° prism (as the target reflector), and the reflected beam is sensed by the ATR sensor. Depending on the deviation of the alignment from the optical target axis of the 360° prism, the impinge position of the reflected radiation on the ATR sensor also differs from a central sensor surface position (i.e. the reflection spot of the ATR measurement beam which is retro-reflected at the prism on the ATR large-area sensor is, for example, not located in the center of the ATR large-area sensor and therefore does not impinge at a setpoint position which has been defined, e.g. on the basis of calibration, as that position which corresponds to the optical target axis).

If this is the case, the alignment of the sighting device is usually slightly readjusted in a motorized fashion in such a way that the ATR measurement beam which is retro-reflected at the prism impinges with high precision in the center of the sensor surface on the ATR large-area sensor (i.e. the horizontal and vertical angle of the targeting device are changed and adapted iteratively until the center of the reflection spot coincides with the setpoint position on the ATR large-area sensor). It is then often stated that the target is "locked onto".

Besides the ATR fine-sighting function, an automatic target-tracking functionality can also be made available in a similar way by using the same ATR components (such as ATR light source and ATR detector). After ATR fine sighting has taken place (i.e. after the targeting device is aligned with the target in such a way that the center of the ATR measurement beam reflection spot coincides with the setpoint position—corresponding to the target axis—on the ATR large-area sensor), the targeting device can then continue to track movements of the target "live" and at corresponding speed in such a way the center of the ATR measurement beam reflection spot still remains as accurately as possible always at the setpoint position on the ATR large-area sensor.

In order to ensure the functioning of the automatic sighting on the basis of the evaluation of the position of the reflection spot of the ATR measurement beam, which is retro-reflected at the prism, at the ATR large-area sensor it is necessary, before the function starts, to align the sighting device with the target reflector at least approximately in such a way that the ATR measurement beam in general impinges on the prism and, having been reflected from there, on the ATR large-area sensor. In other words, the target must firstly be found so that the targeting device can be at least approximately aligned with the target. Such finding of the target is also necessary alongside the initial approximate alignment which takes place at the start of the measurement if the target moves suddenly and quickly in such a way that it disappears from the field of vision of the ATR detector (i.e. ATR measurement radiation reflected at the target no longer impinges on the ATR large-area sensor) and therefore the "lock-on" has been lost. Other causes of an interruption of the optical link between the total station and the target object may be, for example, unfavorable environmental conditions (precipitation, fog, dust etc.) or simply visual obstacles that block the optical link.

The approximate alignment of the sighting device with the target object so that the ATR measurement beam which is reflected by said target object impinges on the ATR sensor can occur e.g. by means of manual sighting of the target reflector by measurement by eye. However, the automated theodolites or total stations which are common nowadays are equipped with an optoelectronic target seeking and positioning device, referred to below as an automatic target detection unit or target-finding unit (AZE). Such theodolites are able to move automatically toward the target point and usually also at least to determine its position approximately. By means of the AZE it is therefore possible to align the sighting device or the target axis automatically at least approximately with the target object in such a way that fine sighting and/or target tracking is then possible by means of the ATR components. When the function operates satisfactorily, the saving in time with such automated instruments compared to approximate manual alignment is considerable.

A geodetic surveying system with an AZE according to the prior art is proposed, for example, in U.S. Pat. No. 6,035,254. According to this patent, the total station as the surveying device and the target object are respectively equipped with a receiver for receiving GPS data. Position information for estimating the position of the target object from received GPS data is transmitted to the total station and is used at the total station to determine how the total station has to be aligned for sighting of the target object. However, such satellite-supported AZE requires a free line of sight to a plurality of satellites. Use in narrow passages between houses or under trees or bridges or inside tunnels or buildings is therefore disadvantageously restricted or impossible. In addition, sighting of a moving target is disadvantageously not possible or at least not possible in a robust fashion.

European patent EP 1,329,690 discloses a method for automatically finding a geodetic target object, wherein radiation which is emitted in a fan which is aligned perpendicularly and which is pivoted horizontally is generated by a radiation transmitter unit of an AZE, e.g. by means of a pulse laser diode. If the AZE radiation impinges on the target, a portion of the radiation is reflected and received by a receiver unit, on the basis of which a horizontal angle with respect to the target is determined. It is disadvantageous that with the method according to EP 1,329,690, it is also not possible to sight a moving target, or at least not in a robust fashion.

SUMMARY

Some embodiments of the present invention make available an improved device for automatically finding a target object which defines a target point.

Some embodiments of the present invention make available a device by means of which a moving target object which defines a target point can be found automatically.

Features which develop the invention in an alternative or advantageous fashion can be found in the patent claims and the description including the descriptions of the figures. All the embodiments of the invention which are illustrated or presented in this document in some other way are capable of being combined with one another unless expressly stated otherwise.

The present invention relates to surveying systems for determining the position of a target point. The system has a surveying device, preferably embodied as a total station, theodolite or tachymeter, and a target object which defines the target point. The target object is preferably embodied as a retro-reflector. Furthermore, the surveying system has a control and evaluation unit with an evaluation, data processing and control functionality, a first radiation source for generating target-finding radiation, preferably in the form of modulated laser radiation, and means for multi-directional emission of the target-finding radiation into free space. The term multi-directional is to be understood here as meaning that target-finding radiation can be emitted simultaneously or virtually simultaneously in different directions, e.g. in the form of a beam fan or radiation cone, wherein the fan or cone is generated by widening or quickly pivoting a beam. In this context, the first beam and the emission means are optionally arranged on the surveying device.

The surveying device has a sighting device, preferably a telescopic sight, which defines a target axis and means for changing the alignment of the target axis about a first, preferably vertical, axis and about a second axis which is preferably perpendicular with respect to the first axis. In addition, the surveying device has, preferably as part of a target-finding unit, a photosensitive line sensor for detecting target-finding radiation. The reception range of the line sensor is in the form of a, preferably vertical, reception fan here. The target axis has a defined spatial reference relation with respect to the plane of the reception fan, preferably by virtue of it being parallel with respect to the plane of the reception fan or being in the plane of the reception fan. The spatial reference relation can be changed here in a defined fashion, or the target axis and the reception fan are fixedly arranged with respect to one another. The target axis and reception fan are preferably arranged fixedly with respect to one another at least in the horizontal direction, wherein the means for changing the alignment of the target axis in the horizontal direction simultaneously also change the alignment of the reception fan to the same extent.

Furthermore, the surveying device has, preferably as part of a target fine-sighting unit, a second radiation source for generating fine-sighting radiation, preferably as laser radiation, and means for emitting the fine-sighting radiation coaxially with respect to the target axis in the form of a radiation cone with a small angle of aperture. The angle of aperture of the radiation cone is preferably considerably smaller than that of the reception fan of the line sensor and is e.g. at maximum 10°, preferably 5°, specifically at maximum 2°. Furthermore, the surveying device has photosensitive large-area sensor, preferably a CMOS-2D sensor, for detecting fine-sighting radiation which is reflected by the target object.

According to the invention, the control and evaluation unit is designed to track the target object, moving relative to the surveying device, within the scope of a target-finding functionality, wherein within the scope of the target-finding functionality the following steps are carried out continuously and automatically by the control and evaluation unit in accordance with a defined algorithm with continuous emission of target-finding radiation: target-finding radiation which originates from the target object is detected with the line sensor and a first change in alignment of the target axis about the first axis occurs as a function of detected target-finding radiation, with the result that the target axis tracks the movement tendency of the target object.

The term "originating from the target object" is understood to mean here that the target object itself emits target-finding radiation (the target object has the first radiation source) and/or the target object reflects emitted target-finding radiation (the surveying device has the first radiation source). The term movement tendency is to be understood as meaning the movement of the target object in at least one spatial direction or the projection of the movement of the target object in one or two directions of the internal coordinate system of the surveying device or surveying system. For example, the movement tendency is the movement of the target object in the horizontal direction or the movement of the target object such as it is "seen" in a vertical plane of projection of the surveying device without a movement component in the direction of the visual axis, that is to say without the portion of the movement of the target object which brings about a change in the distance between the target object and the surveying device.

In order to be able to detect target-finding radiation originating from the target object, the relative position of the surveying device and the target object must be such that target-finding radiation originating from the target object must be capable of being received by the line detector. If this is not the initial situation from the outset, the surveying device waits passively within the scope of the target-finding functionality while the target-finding radiation is emitted, until the target object has reached, on the basis of its own movement, such a position which is suitable for the reception of target-finding radiation until therefore e.g. the retroreflector crosses the target-finding radiation emitted by the surveying device, with the result that reflected target-finding radiation enters the field of vision of the line detector and can be detected.

Alternatively, within the scope of the target-finding functionality a change in the initial alignment of the target axis about the first axis occurs, with the result that target-finding radiation originating from the target object is received by the line detector. In other words, in this alternative the surveying device does not wait passively but instead changes actively according to a predefined pivoting profile while target-finding radiation is emitted—e.g. simple continuous and uniform pivoting in a horizontal pivoting direction—the alignment of the target axis until target-finding radiation is received. Optionally, the change in the initial alignment occurs in such a way that with respect to the initial alignment of the target axis pivoting in one direction occurs at maximum within a limited angular range, e.g. an angular range of 30°, 45° or 90°. If no target-finding radiation is received up to the maximum defined pivoting angle, pivoting around occurs, with the result that the change in the initial alignment occurs in the opposite direction. The pivoting in the other direction occurs either in an unlimited fashion until target-finding radiation is received or is also fixed at the outset to be at maximum only within a limited angular range of for example −30°, −45° or −90° with respect to the initial alignment, with subsequent renewed pivoting around with a possibly increased maximum angular range (e.g. 120° or 180°).

Within the scope of the target-finding functionality, the horizontal movement is preferably tracked as a movement tendency (or for short: horizontal movement tendency). In addition, the vertical movement is optionally tracked, with the result that the movement tendency is composed of two spatial directions. Movement tendency is additionally to be understood also as meaning that any minimum movement of the target is not necessarily tracked but instead the movement of the target object is generally tracked without taking account of individual "movement peaks" or movement fluctuations such as can occur e.g. as a result of vibrations or trembling of the target object carrier, for example of a construction machine or caused by the walking of a user.

The tracking of the movement tendency preferably occurs in such a way that despite the movement of the target object or despite the failure of the target object to be stationary, it is therefore advantageously made possible for the target axis to be aligned approximately with the target object at least in such a way that fine-sighting radiation reflected by the target object is detected by the large-area sensor. For this purpose, within the scope of the target-finding functionality the fine-sighting radiation is continuously emitted in the direction of the target axis. In addition besides the first change in alignment a second change in alignment of the target axis about the second axis, that is to say preferably about the horizontal axis, occurs as a further option.

The target-finding functionality is then carried out at least until the specified approximate alignment of the target axis is implemented. In other words, by changing the alignment about the first axis a first, preferably horizontal, alignment of the target axis occurs, and by means of the additional and at least temporarily simultaneous change in alignment about the second axis a second, preferably vertical, alignment of the target axis occurs, with the result that overall the target axis is aligned approximately with the moving target at least in such a way that fine-sighting radiation reflected at least one by the target object is detected by the large-area sensor, with the result that the target is therefore found. If this is the case, the target can be "locked onto" and the ATR can be used for further precise tracking of the movement of the target in both directions with respect to the target. In other words, the target axis thus follows the movement tendency of the target object by means of the target finding tendency until fine-sighting radiation from the large-area sensor is detected or the target object is "locked onto".

As an option, within the scope of the target-finding functionality the movement of the target object is predicted on the basis of detected fine-sighting radiation. In this context, the prediction of the movement is preferably carried out on the basis of at least two, specifically at least three, directions with respect to the target object and/or target object positions acquired by means of detected fine-sighting radiation. Therefore, in this development the target-finding functionality is carried out at least until at least two or three fine-sighting radiation detection processes have taken place, wherein a 2D target direction and/or a 3D target position is acquired on the basis of a detection process (e.g. by means of additional distance measurement). In these embodiments, the "locking on" is optionally carried out on the basis of the estimated movement or an estimated target position derived therefrom.

Optionally, the speed at which the first change in alignment occurs is dynamically adapted to the movement of the target object, in particular the angular speed thereof relative to the surveying device. The target speed is e.g. at least implicitly able to be acquired or estimated on the basis of the time period between two detection processes when a first oscillating change in alignment occurs. Alternatively or additionally, the speed of the second change in alignment is adjusted to the speed of the first change in alignment, preferably in such a way that the fine-sighting radiation successively passes over or covers a spatial area without interruption, which is achieved, for example, by virtue of the fact that the first change in alignment occurs at a much faster rate than the second change in alignment. As a result, despite the relative approximate alignment of the target axis with respect to the first axis (as a result of the first change in alignment), during the target search no regions occur which, even though the target is possibly located in said regions, would otherwise never be irradiated by fine-sighting radiation (as a result of the second change in alignment) but instead (in the case of a second horizontal axis) irradiation would occur only "above" or "below" and would therefore always go past the target object, for which reason it would not be possible to detect fine-sighting radiation or "lock on".

In some embodiments, the first change in alignment occurs in an oscillating fashion between two reversal points in two opposing pivoting directions, wherein a respective reversal point is defined dynamically as a function of an alignment of the target axis, at which alignment target-finding radiation is detected with the line detector.

Therefore, an alternating movement reversal of the change in alignment occurs as a function of detected target-finding radiation, wherein this movement reversal is independent of any movement reversal of the target object itself but rather also occurs with a constant direction of movement of the target. As a result, even in surveying devices with a line sensor with e.g. a vertical reception range, the movement of the target can be followed completely without a horizontal resolution capability, since target-finding radiation which originates from the target is repeatedly received because as a result of such a first change in alignment, with to and fro movement of the target axis, the target axis, on average, continuously points to the target object, at least approximately and with respect to direction and target-finding radiation passes repeatedly into the reception fan (assuming a larger angular speed of the first change in alignment than that of the target object).

As an option, the line sensor, and therefore the reception range are structured into at least two, preferably vertical and/or horizontal, sectors, as a result of which additional location information can be received. This is preferably implemented by means of a structured diaphragm with a photosensitive element and/or a structured photosensitive reception surface, specifically with a linear array of photo-sensitive elements and a diaphragm.

Depending on the structuring, in developments the additional location information is used within the scope of the target-finding functionality to define the, preferably horizontal, pivoting direction of the first change in alignment. For example, the pivoting direction is adapted to the, preferably horizontal, movement tendency of the target object. If the line sensor has e.g. horizontal structuring, for example additional information about the relative horizontal angular position of the target can therefore be received, or the line sensor has an additional, albeit very restricted, horizontal resolution capability, which permits a horizontal direction of movement of the target to be determined. This permits the horizontal movement tendency of the target to be tracked even without the oscillating movement described. Alternatively, or additionally, the additional location information is used within the scope of the target-finding functionality so that the first change in alignment occurs additionally about the second axis as a function of the location information, with the result that the target axis tracks the movement tendency of the target object in two directions, preferably horizontally and vertically, as a function of the detected target-finding radiation. For example by means of approximate vertical structuring of the line sensor it is additionally possible to receive an approximate vertical position of the target and to align the target axis in such an approximately vertical fashion as a function thereof. The second change in alignment then occurs, for example, within the scope of the vertical angular range predefined by this approximate vertical alignment or structuring of the reception range.

As an option, the surveying device has the first radiation source and the means for multi-directional emission of the target-finding radiation. The first radiation source and the means for multi-directional emission of the target-finding radiation are therefore arranged in such embodiments on the surveying device side. Here, the means are preferably embodied in such a way that a transmission fan, which can be pivoted, specifically in the horizontal direction, and is specifically a vertical transmission fan, can be emitted, wherein the target axis is in a defined, optionally fixed, spatial reference relation with respect to the plane of the transmission fan, in particular parallel with respect to the plane of the transmission fan or is in the plane of the transmission fan. Optionally, the transmission fan has an, in particular variable, angle of aperture between 20° and 70°, in particular between 30° and 50°, and/or the means for multi-directional emission have a cylinder lens and/or a micro-lens array and/or a diffractive optical element.

In one development of the surveying system according to the invention, a distance from the target point is determined within the scope of the target-finding functionality on the basis of detected target-finding radiation and/or detected fine-sighting radiation, preferably by means of a pulse propagation time method. The determined distance is optionally used in order to, within the scope of the target-finding functionality on the basis of the determined distance, identify the target object (which makes it possible to differentiate it from other possibly present target objects) and/or to determine an, in particular approximate, position of the target object.

In a further development, the target-finding radiation is pulsed, and a, preferably horizontal, direction of movement of the target object is determined within the scope of the target-finding functionality on the basis of the number of pulses, detected during a detection process, of the detected target-finding radiation, wherein a speed of the movement of the target object is optionally additionally estimated on the basis of the number of pulses.

As a further option within the scope of the target-finding functionality the target object transmits an identification signal to the control and evaluation unit in a wireless fashion, in particular by light signal or radio link, as a result of which it can be differentiated from other target objects.

Alternatively or additionally, the surveying system according to the invention optionally has an exclusion functionality by means of which irrelevant target objects, such as other prisms or similar reflective surfaces, can be suppressed, with the result that they are not sighted or tracked instead of the target object which is actually of interest and is actually to be tracked. Such an exclusion functionality is described in U.S. application Ser. No. 14/727,657 by the same applicant, submitted on 1 Jun. 2015. Within the scope of the exclusion functionality, for example, a 360° search for all retro-reflectors located in the field of vision of the surveying device or of the line sensor occurs in advance, as a result of which the positions of the reflectors are known in advance at least by means of a position coordinate. Such retro-reflectors which do not represent the target object of interest for the current surveying task serve, for example, to perform static marking of surveying reference points. The positions of these reflectors which are not of interest are stored by the surveying system, e.g. in the form of a negative list.

Such a negative list can also be made available by means of other information instead of by means of a search, e.g. by being manually produced by a user. On the basis of a negative list, these selected reflectors can then be excluded from the target tracking and can therefore be filtered or suppressed. For example, target-finding radiation which is reflected from such a stored position, and is therefore reflected by such a target object which is not of interest, is not used for the first change of alignment of the target axis. Therefore, with such a development the target finding can occur in a more efficient way which is less susceptible to disruption.

As a further option, the target object has a GNSS receiver and the initial alignment which takes place before the continuous steps of detection and first change in alignment is carried out on the basis of a position of the target object which is ascertained by the GNSS receiver. As a result, more robust and/or faster initial alignment with the target is made possible than in the case of initial alignment without prior information.

The present invention also relates to a surveying device, preferably embodied as a total station, theodolite or tachymeter, for determining the position of a target point by means of a target object which defines the target point, wherein the surveying device has a control and evaluation unit with an evaluation, data processing and control functionality, a base and an upper part which can pivot about a first, in particular vertical, axis with respect to the base. The upper part has a sighting device, preferably a telescopic sight, which defines a target axis and can pivot about a second axis, and a target-finding unit having a first radiation source for generating target-finding radiation, in particular modulated laser radiation, means for emitting the target-finding radiation into free space, preferably in the form of a vertical transmission fan with an angle of aperture between 20° and 70°, specifically between 30° and 50°, and a photosensitive line sensor for detecting target-finding radiation reflected by the target object, wherein the reception range of the line sensor is in the form of a, preferably vertical, reception fan, and the target axis is in a defined spatial reference relation with respect to the plane of the reception fan. In this context, the target axis is optionally parallel with respect to the plane of the reception fan or is in the plane of the reception fan, and/or the target-finding unit is mounted in a fixed positional relation with respect to the sighting device and can be pivoted with the sighting device about the second axis.

The upper part also has a target-fine-sighting unit which is mounted in a fixed positional relation with respect to the sighting device and can be pivoted with the sighting device about the second axis, having a second radiation source for generating fine-sighting radiation, preferably laser radiation, means for emitting the fine-sighting radiation coaxially with respect to the target axis in the form of a radiation cone with a small angle of aperture, and a photosensitive large-area sensor, in particular a CMOS-2D sensor, for detecting fine-sighting radiation reflected by the target object. The angle of aperture of the radiation cone is preferably considerably smaller than that of the reception fan of the line sensor and is e.g. at maximum 10°, preferably 5°, specifically at maximum 2°.

According to the invention, the control and evaluation unit is designed to track a target object, preferably a retro-reflector, which moves relative to the surveying device, within the scope of a target-finding functionality, for which purpose within the scope of the target-finding functionality continuous alternating pivoting of the upper part about the first axis takes place in an oscillating fashion between two reversal points in two opposite pivoting directions under automatic control by the control and evaluation unit in accordance with a defined algorithm and with continuous emission of target-finding radiation. In this context, a respective reversal point is defined dynamically as a function of an alignment of the upper part, at which alignment target-finding radiation reflected by the target object is detected with the line sensor, with the result that the alignment of the upper part and therefore the target axis tracks the, preferably horizontal, movement tendency of the target object (20).

The present invention also relates to a method for automatically finding a moving target object, which defines a target point, with a surveying device according to the invention, preferably a total station, a theodolite or a tachymeter, wherein within the scope of the method the target object which moves relative to the surveying device is tracked in that, on a continuous basis: target-finding radiation is emitted in the form of an, in particular vertical, transmission fan, and the upper part is pivoted about the first axis in an alternating fashion in two opposing pivoting directions between two reversal points, wherein a respective reversal point is defined dynamically as a function of an alignment of the upper part, at which alignment target-finding radiation reflected by the target object is detected with the line sensor, with the result that the alignment of the upper part and therefore the target object track the, preferably horizontal, movement tendency of the target object.

A further subject matter of the present invention is also a computer program product which is stored on a machine-readable carrier, or computer data signal, embodied by an electromagnetic wave, with program code, which product or signal is suitable for carrying out the method according to the invention, in particular wherein the computer program product is implemented in a surveying system according to the invention or a surveying device according to the invention.

BRIEF DESCRIPTION OF THE DRAWINGS

The surveying system according to the invention and the method according to the invention are described in more detail below purely by way of example on the basis of specific exemplary embodiments illustrated in the drawings, wherein details will also be given on further advantages of the invention. Of course, these illustrated figures are merely schematic illustrations of possible exemplary embodiments.

In particular.

DETAILED DESCRIPTION

Figure 1:
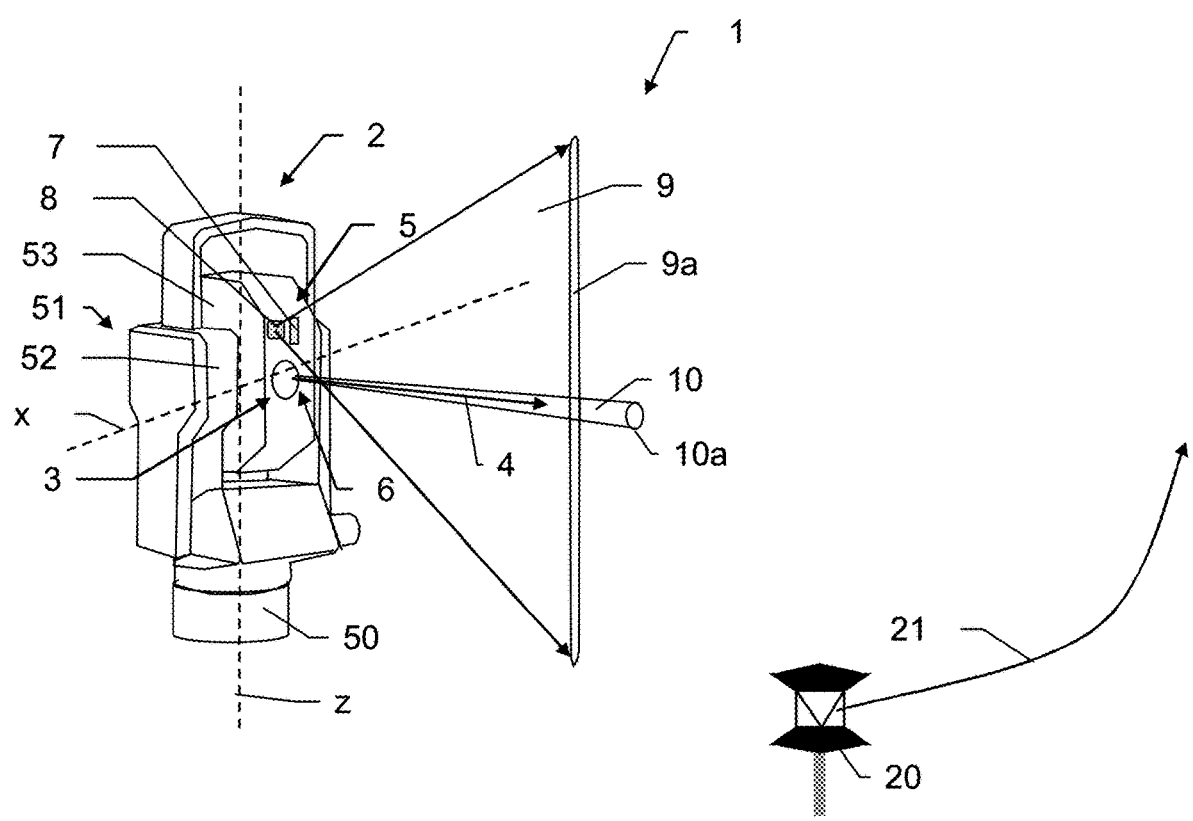
FIG. 1 shows an example of a surveying system according to the invention.

FIG. 1 shows a surveying system 1 according to the invention with a surveying device 2 embodied as a total station, and a target object 20 embodied as a retro-reflector which defines a target point to be surveyed. The surveying device 2 has a control and evaluation unit (not illustrated), a base 50 and an upper part 51. The upper part 51 can pivot with respect to the base 50 about a first axis z. The first axis z is aligned vertically as a standing axis. The upper part 51 has a sighting device 3 with a lens unit, for example a telescopic sight or a telescope. A target axis 4 is defined by the sighting device 3. The alignment of the target axis 4 can be changed by pivoting the upper part 51 about the first vertical axis z. In addition, the alignment of the target axis 4 about a second, in the example horizontal, axis x can be changed. For this purpose, the upper part 51 has a support 52 and a head part 53 which can pivot with respect to the support 52 about the second axis x and in which the sighting unit 3 is integrated.

Besides the targeting device 3, a target-finding unit 5 (referred to for short as AZE) and a target fine-sighting unit 6 (referred to for short as ATR) are integrated into the head part 53. As a result of the exemplary arrangement of the target-finding unit 5, of the target fine-sighting unit 6 and of the sighting device 3 in the head part 53, these three units are located in a defined and fixed positional relation with respect to one another and can pivot together about the first axis z and second axis x.

As an alternative to the illustrated arrangement, the target-finding unit 5 can be integrated in the support 52 with the result that although the spatial reference relation of the target axis 4 with respect to the reception fan of the line sensor 7 is defined, there is no fixed positional relation present, since although both the sighting unit 3 and the AZE 5 together change the horizontal alignment by pivoting of the upper part 51, the sighting unit 3 can pivot about the second axis x, but the AZE 5 cannot.

The target-finding unit 5, or for short the AZE, has a first radiation source 8 and a photosensitive line sensor 7. The first radiation source 8 generates, preferably pulsed, target-finding radiation 9, for example modulated laser radiation. The target-finding unit or AZE 5 has means by means of which the target-finding radiation 9 can be emitted into free space. The emission here takes place using the means in a multi-directional fashion, in the form of a vertical transmission fan 9a in the example, the angle of aperture of which transmission fan 9a is, for example between 20° and 70° or 30° and 50° and can be variable. Target-finding radiation 9 which is retro-reflected from the target object 20 can be detected by the line sensor 7, wherein the line sensor 7 has a reception range which is in the shape of a fan (not illustrated), and the plane of the fan is preferably arranged vertically like that of the transmission fan. The target axis 4 is, for example, in the plane of the reception fan. Alternatively, the target axis 4 is parallel with respect to the plane of the reception fan or is in another fixed and defined spatial reference relation with respect thereto.

The target fine-sighting unit 6, or for short ATR unit, has a second radiation source and a large-area sensor (both not illustrated). The second radiation source generates fine-sighting radiation 10, e.g. laser radiation. The target fine-sighting unit 6 has means by means of which the fine-sighting radiation 10 can be emitted coaxially with respect to the target axis 4 in the form of a radiation cone 10a with a small angle of aperture. The angle of aperture is e.g. at maximum 5° or 2° and is, for example, precisely 1.5°. Fine-sighting radiation 10 which is retro-reflected by the target object 20 can be detected by the large-area sensor. As already described at the beginning, the impinging position of the reflected fine-sighting radiation 10 can be used to derive a precise target position, and/or the head part 53 and therefore the target axis 4 and the target fine-sighting unit 6 are aligned precisely with the target object by pivoting the head part 53 about one or both axes x, z, with the result that the impinging position is the center of the large-area sensor, or in the case of a moving target object 20 the target axis 4 is automatically adjusted in such a way that the impinging position continues to be as far as possible in the center ("lock on").

In order to achieve "locking on" onto the target object 20, the target object 20 must firstly be found once, i.e. the target axis 4 must firstly be aligned at least approximately with the target object 20 so that the fine-sighting radiation 10 actually impinges on the retro-reflector 20 and is therefore retro-reflected onto the large-area sensor (which is generally not the case from the outset owing to the small angle of aperture of the fine-sighting radiation 10). Owing to the defined spatial reference relation, which is also possibly fixed as in the example, of the transmission fan 9a and reception fan of the AZE 5, radiation cone 10a of the fine-sighting radiation 10 and target axis 4, it is possible, given an initially unknown relative position of the target object 20 and total station 2 with respect to one another, to bring about alignment of the target axis 4 with the target object 20 by firstly pivoting the upper part 51, and therefore the transmission fan 9a, about the first axis z, and therefore changing the alignment of the target axis 4, until target-finding radiation 9, reflected from the target object 20, is received and detected by the line sensor 7. As a result, the horizontal alignment of the target axis 4 corresponds to the direction towards the target 20. The head part 53 is then pivoted about the second axis x until the fine-sighting radiation 10 impinges on the target 20 and the alignment of the target axis 4 also corresponds in the vertical to the direction towards the target 20.

A single horizontal alignment of the target axis 4 is, however, not sufficient for target finding if the target object 20 is moving relative to the surveying device 2, which is the case e.g. when the target object 20 is mounted on a surveying rod which is moved along by a user or mounted on a mobile vehicle whose target position is to be determined continuously or at specific time intervals. Apart from the case of a relative movement which is only very minor or slow, in fact, within the time period of the pivoting of the target axis 4 about the second axis x, the actual horizontal direction towards the target object 20 moves away from the set horizontal alignment of the target axis 4 so quickly that the radiation cone of the fine-sighting radiation 10 does not impinge on the target object 20 but rather passes it by.

Therefore, the control and evaluation unit is embodied in such a way according to the invention that within the scope of a target-finding functionality a moving target object 20 is tracked automatically. In this context the described horizontal alignment of the target axis 4 until the target-finding radiation 9 reflected from the target object 20 is received by the line sensor 7 serves merely as a change in initial alignment of the target axis 4 in such a way that target-finding radiation 10 is detected (for the first time). On the basis of the detected target-finding radiation 10, a further first change in alignment then occurs about the first axis z as target-finding radiation 10 continues to be emitted. Subsequently, target-finding radiation 10 reflected from the target 20 is detected again by means of the line sensor 7, and a first change in alignment of the target axis is again carried out about the first axis z, that is to say in the horizontal direction in the example, and so on, as a function of the detected target-finding radiation 10. As a result, the target axis 4 tracks the movement tendency of the target object 20, represented by the arrow 21. For example, the movement tendency is the movement of the target object 20, as is "seen" by the surveying device 2 in a vertical plane of protection, without a movement component towards the surveying device 2 or away from it.

This approximate target tracking as a function of the detected target-finding radiation 10 is optionally carried out within the scope of the target-finding functionality, while simultaneously the pivoting of the head part 53 which is described above occurs as a second change in alignment of the target axis 4 about the second axis x, with progressive emission of fine-sighting radiation 10, and occurs at least until the fine-sighting radiation 10 impinges on the target 20, that is to say the moving target object 20 has been found. In other words, the target-finding functionality is therefore carried out until, owing to the first and second changes in alignment of the target axis 4, the latter is aligned at least approximately with the target 20 in such a way that fine-sighting radiation 10 reflected from the moving target 20 is detected by the large-area sensor. The target object 20 can therefore then be "locked onto" and the ATR can be tracked further by means of the target tracking functionality.

FIGS. 2a-2f show in a birds' eye perspective a first example for the first change in alignment as a function of the detected target-finding radiation 9 within the scope of the target-finding functionality. The head part 53 with the target-finding unit 5 and the target object 20 (which is illustrated from a different perspective for the sake of better clarity) are illustrated, said target object 20 moving relative to the surveying device or the target-finding unit 5 (assumed in the example to be stationary), as a movement purely transversely with respect to the y axis (symbolized by the arrow 22), purely for the sake of simplicity in the example. The AZE 5 continuously emits target-finding radiation 5 in the form of a vertical transmission fan, wherein target-finding radiation 9 which is reflected from the target object 20 is received by means of the, likewise vertical, reception fan of the AZE 5 and detected by the line sensor. In the illustrated example of the birds' eye view, the transmission fan and the reception fan are represented together as an arrow, wherein an arrow tip at both ends (see FIGS. 2b, 2d and 2f) symbolizes that target-finding radiation 9 is received and also detected. Purely for the sake of simplicity in the example it is also assumed that the spatial reference relation between the reception fan of the AZE 5 and the target axis 4 is such that the target axis 4 is in the plane of the fan. The dashed arrow therefore also symbolizes the target axis 4.

Figure 2:
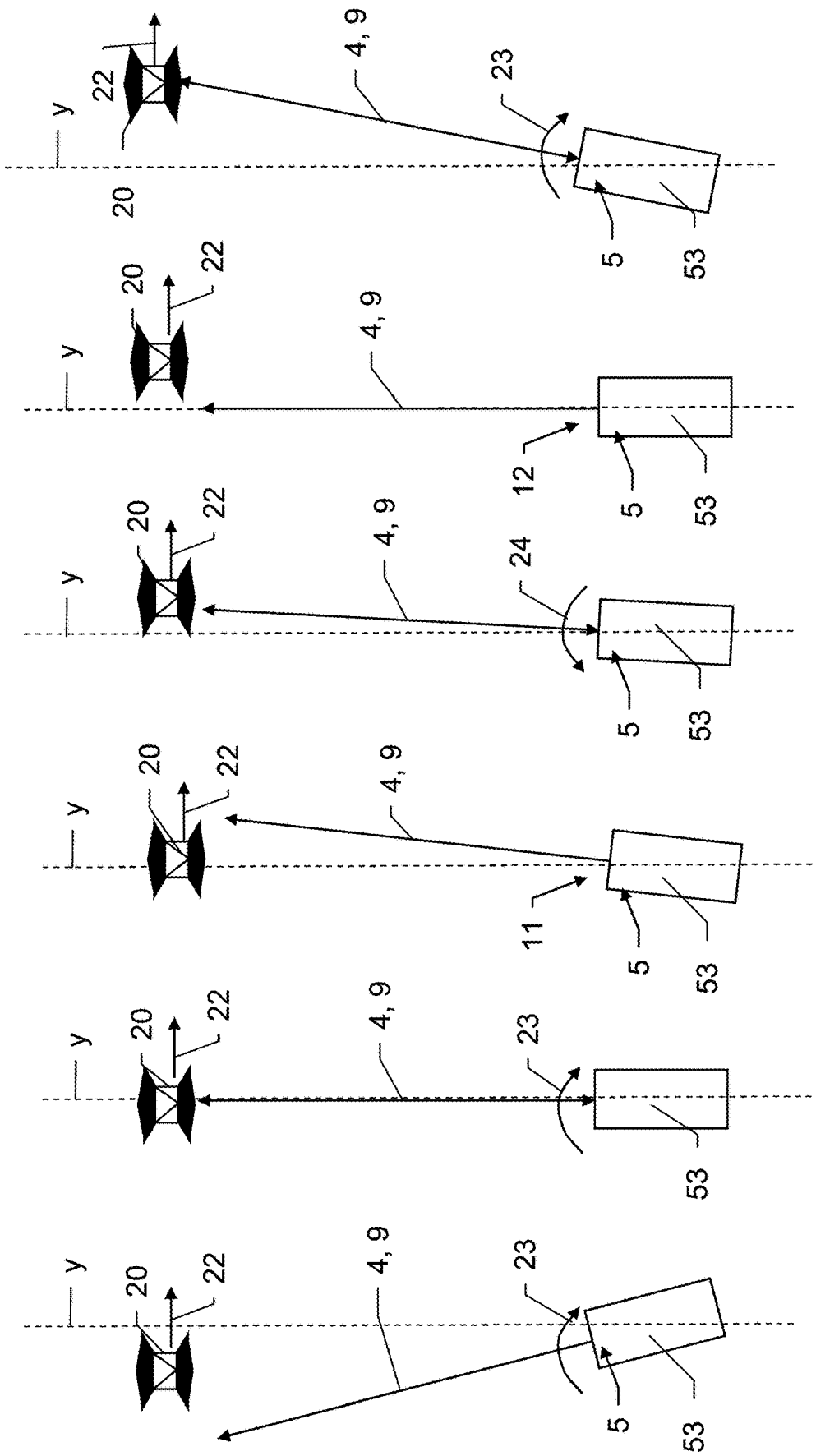
FIGS. 2a-f show an example of the first change in alignment within the scope of the target-finding functionality.

In FIG. 2a, pivoting of the head part 53, and therefore of the AZE 5 and of the target axis 4, about the first axis z, that is to say in the horizontal plane in the example, is illustrated, said pivoting occurring in a first pivoting direction to the "right" (arrow 23) and serving as a change in initial alignment of the target axis 4. For the sake of simplified or faster alignment of the target axis y with the target 20, the latter is optionally provided here with a GNSS receiver, and a position of the target 20 which is determined therewith is used for the change in initial alignment. In the instantaneous relative position of the target object 20 and surveying device the target-finding radiation 9 passes by the reflector 20 "on the left".

FIG. 2b illustrates that this change in initial alignment in FIG. 2a has occurred to such an extent that the target-finding radiation 9 impinges on the target object 20 and is reflected, received and detected, wherein the pivoting in the first pivoting direction (arrow 23) is still continued here. As an alternative to a change in initial alignment of the target axis 4 or of the head part 53 the surveying device "waits", with continuing emission of target-finding radiation 9, until the moving target object has reached the relative position illustrated in FIG. 2b (as it were "runs" into the target-finding radiation 9), with the result that the alignment of the target axis 4 (and of the head part 53) illustrated in FIG. 2b represents the until then static alignment of the target axis 4.

In FIG. 2c, the alignment of the target axis 4 is such that the transmission fan then passes by the target object 20 "on the right". The pivoting in the first pivoting direction and therefore the change in the initial alignment are ended and the head part 53 is at rest. A first reversal point 11 of the pivoting movement is then reached. The reversal point 11 is defined as a function of the detected target-finding radiation 9, or formulated more precisely as a function of the alignment of the target axis 4, at which alignment the target-finding radiation 9 is detected. In the example, the dependence is such that the reversal of the pivoting movement is initiated by the detection, and then brings about, with a certain delay (induced inter alia by inertia) the brief standstill of the head part 53 (illustrated in FIG. 2c) before the pivoting direction in the opposite direction to the "left" then occurs.

In FIG. 2d, this pivoting in the second pivoting direction (arrow 24), opposite to the first, is represented as part of the first change in alignment during which the target axis 4 is then changed to the "left" in its alignment. As a result, the transmission fan then passes over the target object 20 again (a second time in the example) with the result that target-finding radiation 9 originating from the target object 20 is received and detected by the line sensor.

FIG. 2e illustrates the situation which is complementary to FIG. 2c: the pivoting in the second pivoting direction (to the "left") has just ended and the pivoting has arrived at the second reversal point 12. Like the first reversal point, the second reversal point 12 is defined as a function of the detected target-finding radiation 9, and in the example in such a way that the pivoting movement beyond the target 20 occurs before the pivoting movement reversal occurs. The two reversal points 11, 12 depend here, as explained, dynamically on the alignment of the target axis 4 or of the upper part of the surveying device, in which alignment target-finding radiation 9 is detected, and therefore are in dependence on the relative position of the target object 20.

FIG. 2f represents the repeated program of the first inventive change in alignment of the target axis and corresponds to the situation in FIG. 2b: the pivoting now again takes place to the "right" (arrow 23), with the result that after a time period which is dependent on the relative speed or angular speed of the target object 20 and on the speed of the change in alignment (that is to say the rotational rate of the head part 53), the target-finding radiation 9 impinges on the target 20 again and is detected. In this context, the speed of the first change in alignment is preferably adapted dynamically or adaptively to the target object speed.

The steps illustrated in FIGS. 2a-2f (to be more precise in FIGS. 2b-2e) are repeated continuously, with the result that alternating pivoting of the upper part occurs continuously, and therefore the first change in alignment occurs in an alternating fashion. The alignment of the target axis 4 oscillates to and fro between the two reversal points 11 and 12, wherein the two reversal points 11 and 12 shift dynamically as a function of the (horizontal) direction with respect to the moving target 20 (i.e. the movement reversal at a respective reversal point occurs with in each case a different horizontal alignment of the target axis 4). As a result, the target axis 4 tracks the horizontal movement tendency of the target 20, that is to say in the example the movement of the target object in the horizontal direction (symbolized by the arrow 22), i.e. the target axis 4 follows the course or trend of the movement 22 of the target 20, with the result that the target axis 4 in the example tracks the target 20 to the "right", or rather is carried along with the target 20. The central alignment of the target axis 4 (i.e. its alignment without taking into account the oscillating movement as a result of the alternating pivoting) therefore always corresponds at least approximately to the direction of the surveying device with respect to the moving target object 20.

Figure 3:
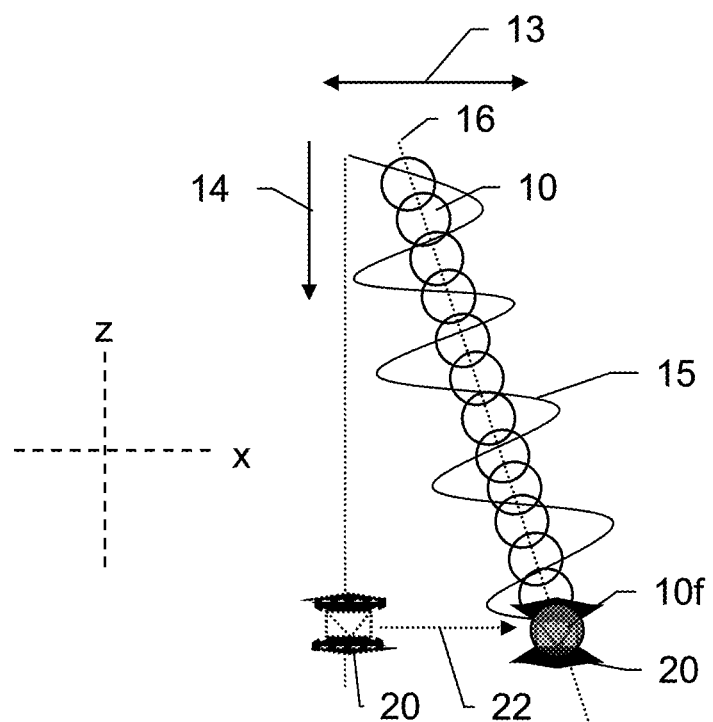
FIG. 3 shows an example of a development of the target finding according to the invention with a first and a second change in alignment.

FIG. 3 illustrates in a vertical plane the oscillating pivoting movement of the upper part of the surveying device about the first axis z as a result of the first change 13 in alignment as a function of the detected target-finding radiation and therefore as tracking of the movement tendency 22 of the target 20. Furthermore, FIG. 3 illustrates that within the scope of the target-finding functionality a second change 14 in alignment of the target axis about the second axis x is continuously effected, e.g. in that the head part of the surveying device is pivoted from top to bottom. This results in a sinusoidal movement 15 of the target axis as a result of the superimposition of the first and second changes 13, 14 in alignment, wherein the dashed line 16 illustrates the profile of the central alignment of the target axis (as it were the line 16 represents a type of compensating line). In this context, fine-sighting radiation 10 is emitted continuously (represented figuratively as a cross section of the radiation cone, cf. FIG. 1). As a result of the first change 13 in alignment, that is to say the oscillating movement in the horizontal and therefore on average alignment of the target axis in the horizontal with the target 20, and the second change 14 in alignment, that is to say the continuous vertical movement from "top" to "bottom" it is ensured that after a longer or shorter period of time fine-sighting radiation 10 impinges on the target object 20, illustrated in FIG. 3 as a solid cross section 10f. In other words, the inventive tracking of the movement tendency 22 of the target 20 by means of the first change 13 in alignment thus ensures that even in the case of a moving target 20 the target axis is aligned horizontally (on average) with the target 20, with the result that the target axis and therefore the fine-sighting unit can also be aligned vertically with the target 20 by means of the second change 14 in alignment, and the target 20 itself can therefore be found and "locked onto" even when there is a small relative movement between the target 20 and the surveying device.

The speed of the second change 14 in alignment is advantageously adjusted here to that of the first change 13 in alignment so that no gaps occur in the vertical movement of the fine-sighting radiation 10, between which gaps the target 20 could "slip through" and would therefore not be found. This is represented symbolically in FIG. 3 by virtue of the fact that the cross sections of the fine-sighting radiation 10, which stand for in each case a detection process (or rather detection attempt, as up to the last illustrated alignment of the target axis 10f it is, of course, not possible to detect any fine-sighting radiation 10 owing to the vertical aiming past the target 20) of the large-area sensor, are arranged in an overlapping row one against the other. Therefore, a spatial region along the line 16 is successively covered or passed over by the fine-sighting radiation 10.

Figure 4:
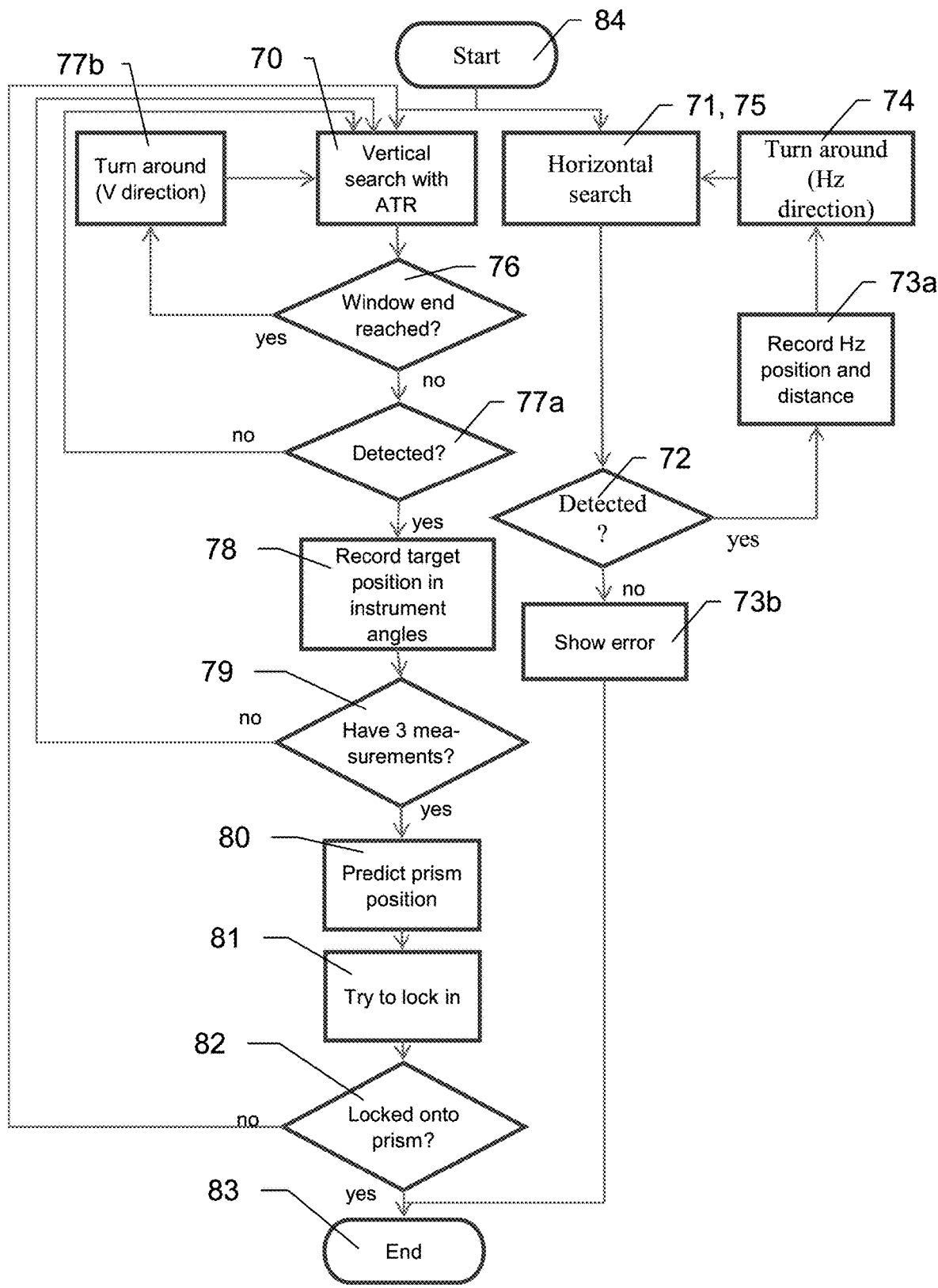
FIG. 4 shows an example of a method sequence according to the invention for target finding in a block diagram.

FIG. 4 is a schematic view of an exemplary method sequence according to the invention for automatically finding a moving target. With the start 84 of the target-finding functionality, the initial alignment of the target axis about the first axis starts in the example as a horizontal movement 71. If the target is detected by means of the target-finding radiation (field 72), the horizontal position (direction) is determined, and in the example the distance is additionally determined by means of distance measurement (field 73a). Subsequently, the pivoting direction is reversed (field 74) as a first change in alignment, and the target axis is pivoted horizontally in the opposing direction (field 75). If no radiation is detected even in the case of an initial 360° pivot, a fault message is displayed (field 73b) and the functionality is ended (field 83). Optionally, filtering or exclusion of undesired static targets which can be detected or would be able to be detected in addition to the target to be tracked, and whose position is stored at least in the horizontal direction is carried out here, with the result that radiation of these targets is not detected or is ignored, or the emission of target-finding radiation with alignment of the target axis in the direction of the previously known targets which are not of interest is interrupted from the outset (not illustrated in the sequence diagram).

This process (fields 72, 73a, 74, 75) is continuously repeated, while simultaneously a vertical search is carried out by means of the ATR (field 70) until fine-sighting radiation originating from the target is detected and a target position is determined on the basis of the detected fine-sighting radiation (fields 77a and 78). (In the event of the pivoting range about the second axis having been fully utilized (field 76) without the target having been detected, the second change in alignment is continued with continuous emission of fine-sighting radiation in that the vertical pivoting detection is reversed (field 77b)). The search with the target fine-sighting unit (field 70), i.e. the second change in alignment with simultaneous emission of fine-sighting radiation and the simultaneous tracking of the movement tendency of the target with the target-finding unit according to the fields 72, 73a, 74, 75 is continued in the example until three target positions are measured by means of the ATR (field 79). On the basis of these three target positions a target position is predicted (field 80), and on the basis of this previously estimated target position, "locking on" onto the target is attempted (field 81). If the "locking on" is successful, the target-finding method is ended (field 83), otherwise it is continued until such "locking on" is successful.

As has therefore been described by way of example, as an option the target-finding functionality is not stopped with the initial hitting of the target and detection of fine-sighting radiation but instead at least continued until at least two or three detection processes have taken place with the fine-sighting unit. In this context, directions towards the target and/or a position of the target object are respectively determined on the basis of the detected fine-sighting radiation, wherein the position is preferably three-dimensional by means of a distant measurement on the basis of the fine-sighting radiation. On the basis of these at least two or three directions or positions and therefore on the basis of detected fine-sighting radiation the further movement sequence of the target is then estimated by means of the control and evaluation unit. A prediction of the movement of the target is then made.

Figure 5:
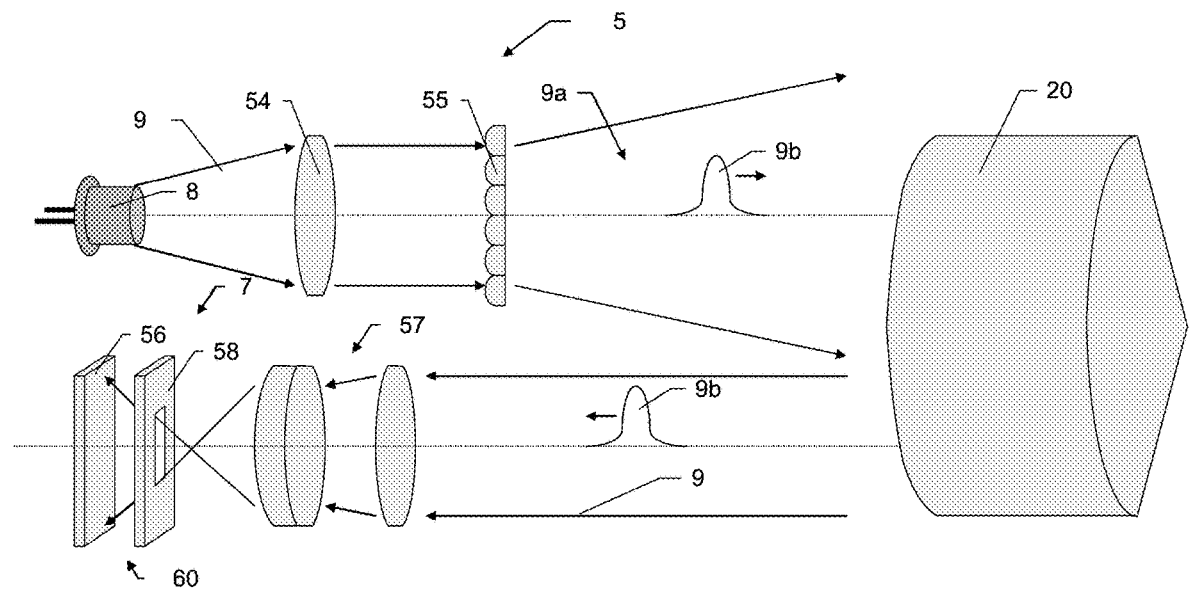
FIG. 5 shows an exemplary embodiment of a target-finding unit according to the invention.

FIG. 5 shows an exemplary embodiment of an AZE 5. Electromagnetic radiation with pulses 9b as target-finding radiation 9 is generated by a pulse laser diode as a first radiation source 8 as a transmission diode with impulse modulation. A suitable pulse length is, for example, 50 nanoseconds. Optionally, within the scope of the target-finding functionality the distance to the target 20 is determined on the basis of the target-finding radiation 9, which can occur in the example on the basis of the pulsed radiation, e.g. by means of a pulse propagation time method. The determined distance is used as a further option in order to identify the target 20 or differentiate it from other targets which are closer or further away, which makes the target finding more robust. In this context or else independently thereof, the distance is used to determine an approximate position of the target 20 together with a direction determined on the basis of the inventive target finding (alignment of target axis). Alternatively or additionally, identification of the target 20 is made possible by virtue of the fact that it transmits an identification signal to the control and evaluation unit in a wireless fashion.

Since it is normally the case that during a detection process not only one pulse but rather a plurality of pulses (e.g. 10-30) are detected in succession while target-finding radiation 9 passes over the target object 20, as a further option the relative direction of movement of the target 20 is inferred on the basis of the number of pulses detected during a detection process. Given movement of the target object 20 and upper part of the surveying device in the same direction, i.e. in one pivoting direction which coincides with the direction of movement (e.g. both to the "left"; wherein, as described, the angular speed of the pivoting is higher than that of the target object 20), a relatively increased number of pulses is detected, since the passing over lasts for longer. Given movement in the opposite direction and a pivoting direction counter to the direction of movement of the target, the number is reduced (e.g. in comparison with the average when the target 20 is stationary). Therefore, the direction of movement of the target 20 can be determined from the detected number of pulses. As a further development, the movement speed of the target 20 can also be estimated according to the same principle given a known rotational speed of the first change in alignment.

In the example, the generated radiation 9 is emitted in a fan 9a which is aligned perpendicularly and which is generated on the device side by a combination of a lens 54 and a cylinder lens array 55. However, alternatively it is also possible to use other suitable components such as e.g. microlens arrays or diffractive optical elements. After the emission and a reflection at the target 20, which has, for example, a retro-reflector as an example of a suitable reflector, the reflected pulse 9b is received by the line detector 7. In this context, on the receiver side the fan-like field of vision 60 is implemented by a slotted diaphragm 58 ahead of a reception diode as a photosensitive element 56 together with a lens 57 with a cylindrical effect.

Figure 6:
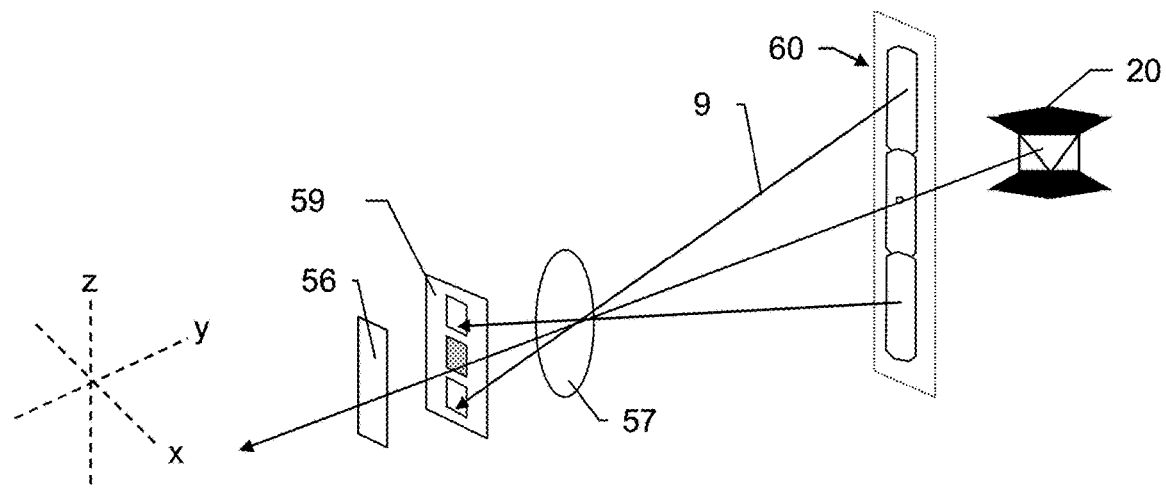
FIG. 6 shows an example of a development according to the invention of a target-finding unit.
Figure 7:
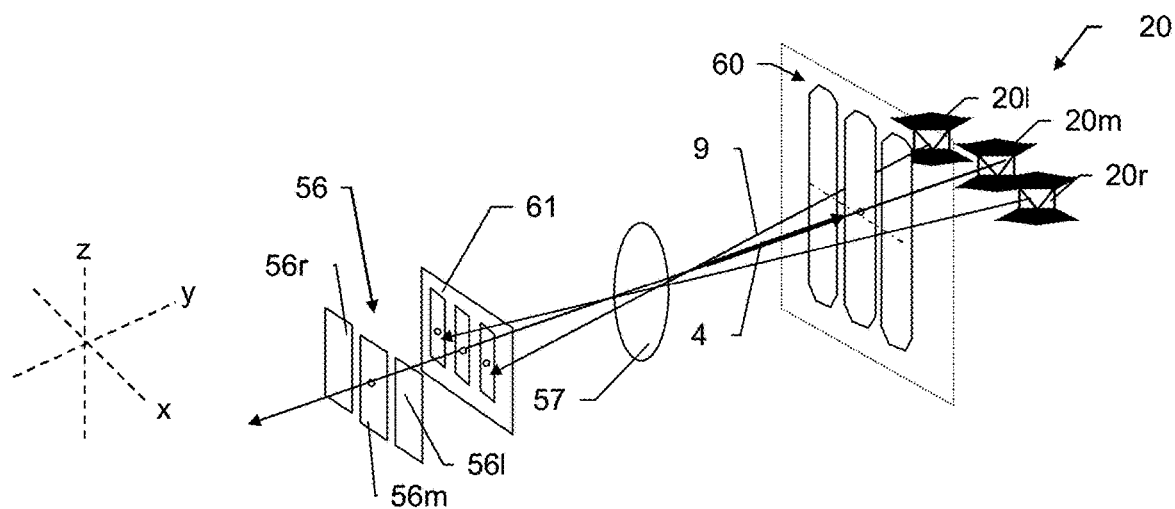
FIG. 7 shows a further example of a development according to the invention of a target-finding unit.

The FIGS. 6 and 7 show developments with which the target finding can be improved further, with an inventive receiver unit with structured reception fan, with the result that the fan-shaped field of vision 60 is therefore divided into a plurality of sectors. However, alternatively it is also possible to use a plurality of fans one next to the other. In all the examples, the sensor fan 60 is divided on the reception side into sectors or segments. As a result approximate determination of spatial position is also possible in the direction of the fan.

FIG. 6 shows the structuring of the fan of the target-finding unit. The radiation 9 which is emitted by means of the first radiation source and reflected by a retro-reflector 20 is then received by division of the reception fan 60 with additional local information. This division of the fan 60 into a plurality of sectors can be implemented by means of a slotted diaphragm 59 at the first focal point of the cylindrical receiver optics 57. In the case of the embodiment illustrated in FIG. 6, a switchable slotted diaphragm 59 is used in which the transmission of the relevant slot can optionally be changed. The photosensitive element 56 is located in the region of the second focal plane, in order to cover the field of vision of the reception optics 57 with high transmission in the spatial direction perpendicularly with respect to the reception fan 60. The reception fan 60 is divided by the slotted diaphragm 59 into, for example, three sectors, which also permits approximate determination of the position or direction in the vertical direction. In the illustrated example, the radiation coming from the retro-reflector 20 passes through the central opening in the slotted diaphragm 59, with the result that approximate information about the angular range is present in the vertical direction as additional location information.

In such embodiments according to FIG. 6, as a further option within the scope of the target functionality the first change in alignment is carried out not only about the first axis z but also additionally about the second axis x as a function of the additional location information. The head part is pivoted as a function thereof about the second axis x, in which sector of the reception fan 60, the target-finding radiation 9 originating from the target 20 is received or, by which sector of the photosensitive element 56 of the line sensor, radiation 9 is detected. Therefore, as a function of the detected target-finding radiation 9 the target axis tracks the movement tendency of the target 20 as described above in the horizontal direction (x-y plane) and furthermore additionally in the vertical direction (x-z plane). As a result of this at least approximate tracking also in the vertical direction and therefore at least approximate central alignment of the target axis with the target object 20 also in the vertical direction, faster and/or more robust target finding is made possible, since the vertical alignment of the target fine-sighting unit and therefore of the target sighting radiation is carried out with prior information about the approximate vertical direction with respect to the target 20, or an approximate alignment with the target 20 is already present in the vertical direction.

FIG. 7 shows a different embodiment of the target-finding unit with a plurality of fan partial regions or fan sectors. The generation of a plurality of reception lines, arranged one next to the other, as reception fans 60 is carried out by using a structured photosensitive reception surface 56 in the second focal plane, in particular in conjunction with a slotted diaphragm 61 which is structured in the same arrangement. This division of the photosensitive reception surface 56, into e.g. a plurality of (three here) detection lines arranged horizontally one next to the other and a linear array of photodetectors, generates here the division of the reception fan 60 into detection lines 56*r*, 56*m* and 56*l*. Three reception lines 56*r*, 56*m* and 56*l* are illustrated here as an example, and another detection line number can be brought about by selecting a suitable division. It is therefore possible, in particular, also to implement fans with two or four reception lines.

The central detection line 56*m* of this example is arranged centrally and is precisely congruent in the horizontal with the target axis 4, with the result that target-finding radiation 9 which is therefore reflected from the target 20 is detected if the target is located in a central horizontal position 20*m* and the target axis 4 is aligned precisely with the target 20 in the horizontal direction. The right-hand reception line 56*r* detects if the target 20 is in a position 20*r* slightly "to the right" of the target axis 4, and the left-hand reception line 56*l* correspondingly detects if the target 20 is slightly "to the left" of the target axis 4 (in order to illuminate the target 20 in these respective positions with target-finding radiation 9, e.g. the transmission fan is widened transversely with respect to the plane of the transmission fan compared to embodiments with just one detection line or reception line). Approximate information about the angular range can therefore be received in the horizontal direction as additional location information.

Therefore, in such embodiments, on the basis of the detected target-finding radiation 9 information is available as to whether the target 20 is "to the right" or "to the left" of the target axis 4, and by means of successive detection operations information is available as to whether the target 20 is moving "to the right" or "to the left". Therefore, in such embodiments, after an initial alignment of the target axis 4 with the target object 20 the first change in alignment of the target axis 4 optionally occurs as a function of the detected target-finding radiation 9 in such a way that the pivoting direction is defined on the basis of the additional location information. The pivoting direction is therefore adapted e.g. as follows to the direction of movement of the target 20: if, during a detection process, target-finding radiation 9 is firstly detected with the central detection line 56*m* and also with the "right-hand" detection line 56*r*, the upper part and the target axis 4 are pivoted to the "right". If the reflected target-finding radiation 9 migrates to the "left", the change in alignment about the first axis z occurs to the "left". In such embodiments, this type of first change in alignment can occur as an alternative to the first change in alignment with pivoting which oscillates to and fro as described with respect to FIGS. 2*a*-2*f* and 3.

As a further development of a target-finding unit, a two-dimensional division or structuring of the reception range is achieved optionally e.g. by means of combination of two structured PIN diodes whose structuring alignment is aligned at a right angle with respect to one another. Therefore, in such embodiments vertical and also horizontal structuring of the reception fan in the horizontal and vertical sectors is achieved, for example, by a combination of the embodiments according to FIGS. 6 and 7.

Figures 8A, 8B, 8C:
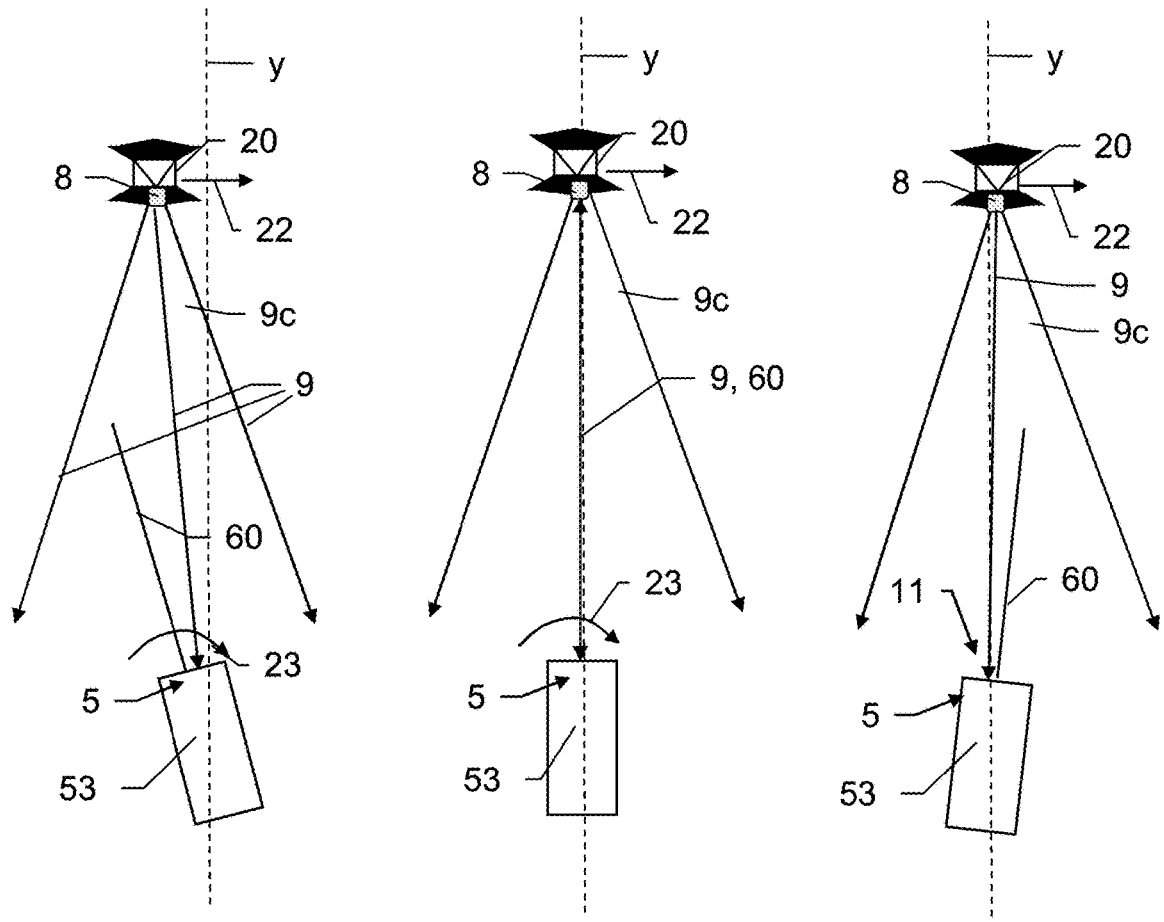
FIGS. 8a-c show an alternative embodiment of a surveying system according to the invention.

As illustrated in FIGS. 8*a*-*c*, as an alternative to the described embodiments in which the surveying device has the first radiation source 8 for generating target-finding radiation, the surveying system is such that the target object 20 has the first radiation source for generating target-finding radiation 9, and the means for the emission thereof. The FIGS. 8*a*-*c* are based on FIGS. 2*a*-2*c* or equivalently on the FIGS. 2*c*-2*e* and represent the target 20 which moves relative to the surveying device, and the head part 53 which is pivoted. The first radiation source 8 and the emission means which are integrated in the target 20 in this example, ensure that target-finding radiation 9 is emitted in a multi-directional fashion, e.g. in the form of a radiation cone 9*c* (in FIGS. 8*a*-*c* this is illustrated purely schematically as a horizontal section) with a large angle of aperture of e.g. 120°. The target 20 is aligned here approximately with the total station, with the result that the surveying device is in the radiation cone 9*c*. Alternatively, the multi-directional emission occurs through 360° in the horizontal direction and with an angle of aperture of e.g. 150° in the vertical direction, with the result that approximate alignment of the target 20 is unnecessary. As a further alternative, there is multi-directional emission by pivoting a radiation cone or beam fan in the manner of a lighthouse.

As a result of the approximate alignment of the radiation cone 9*c*, in the alignment of the head part 53 or of the target axis illustrated in FIG. 8*a*, target-finding radiation 9 impinges on the head part 53. However, owing to the vertical reception fan of the line sensor of the target-finding unit 5, said target-finding unit is not received and accordingly cannot be detected.

In the arrangement in FIG. 8*b*, the upper part of the surveying device and therefore the head part 53 are then pivoted to such an extent that the target-finding radiation 9 is in the plane of the reception fan 60, and is therefore received and detected.

In FIG. 8*c*, the first change in alignment of the target axis takes place to such an extent that again no target-finding radiation 9 can be received. In other words, the upper part pivots as it were "beyond" the target 20.

In embodiments with a radiation source 8 at the target object 20 it is also possible, within the scope of the target-finding functionality, for the surveying device to carry out a change in initial alignment actively or to wait passively until the target-finding radiation 9 is detected by a movement of the target 20. Furthermore, as an alternative to the illustration in FIGS. 8*a*-8*c*, the first change in alignment can occur continuously without oscillating pivoting, e.g. on the basis of additional location information by means of a sectored line sensor (see FIG. 7). That is to say a self-emitting target 20 can be used independently of the type of first change in alignment of the target axis, e.g. both with "oscillating" surveying devices as well as with other types of pivoting of the upper part. Generally, the various approaches can be combined with one another according to the invention and combined with devices and methods for target finding from the prior art.

The invention claimed is:

1. A surveying system for determining the position of a target point using a surveying device and a target object which defines the target point, wherein the surveying system comprises:

a control and evaluation unit with evaluation, data-processing, and control functionality;
a first radiation source for generating target-finding radiation; and
a means for multi-directional emission of the target-finding radiation into free space,
wherein the surveying device comprises:
a sighting device which defines a target axis,
a means for changing the alignment of the target axis about a first axis and a second axis,
a photosensitive line sensor for detecting target-finding radiation, wherein the reception range of the line sensor is in the form of a reception fan, and the target axis has a defined spatial reference relation with respect to the plane of the reception fan,
a second radiation source for generating fine-sighting radiation,
a means for emitting the fine-sighting radiation coaxially with respect to the target axis in the form of a radiation cone with a small angle of aperture, and
a photosensitive large-area sensor for detecting fine-sighting radiation reflected by the target object,
wherein the control and evaluation unit is configured to track the target object, moving relative to the surveying device, using a target-finding process carried out continuously and automatically by the control and evaluation unit in accordance with a defined algorithm with continuous emission of target-finding radiation, the target-finding process including detecting target-finding radiation originating from the target object using the line sensor, and performing a first change in alignment of the target axis about the first axis as a function of detected target-finding radiation, such that the movement tendency of the target object is tracked according to the target axis.

2. The surveying system according to claim 1, wherein the target-finding process also includes emitting fine-sighting radiation in the direction of the target axis, and performing a second change in alignment of the target axis about the second axis, wherein the target-finding process is carried out at least until, owing to the first and second changes in alignment, the target axis is aligned approximately with the target object such that fine-sighting radiation reflected by the target object is detected by the large-area sensor.

3. The surveying system according to claim 2, wherein the speed of the second change in alignment is adjusted to match the speed of the first change in alignment.

4. The surveying system according to claim 2, wherein during the target-finding process, on the basis of detected fine-sighting radiation, the movement of the target object is predicted.

5. The surveying system according claim 1, wherein the first change in alignment occurs in an oscillating fashion between two reversal points in two opposing pivoting directions, wherein a respective reversal point is defined dynamically as a function of an alignment of the target axis, wherein alignment target-finding radiation is detected with the line detector.

6. The surveying system according to claim 1, wherein the line sensor, and therefore the reception range, are structured into at least two sectors so as to receive additional location information by means of a structured diaphragm with a photosensitive element or a structured photosensitive reception surface of photosensitive elements and a diaphragm.

7. The surveying system according to claim 6, wherein during the target-finding process, based on the additional location information, a pivoting direction of the first change in alignment is defined, such that the pivoting direction is adapted to the movement tendency of the target object.

8. The surveying system according to claim 6, wherein during the target-finding process, the first change in alignment occurs additionally about the second axis as a function of the additional location information, such that the target axis tracks the movement tendency of the target object in two directions as a function of the detected target-finding radiation.

9. The surveying system according to claim 1, wherein the surveying device includes the first radiation source and the means for multi-directional emission of the target-finding radiation, wherein the target axis is in a defined spatial reference relation with respect to the plane of the transmission fan.

10. The surveying system according to claim 1, wherein a distance from the target object is determined during the target-finding process based on the detected target-finding radiation or detected fine-sighting radiation.

11. The surveying system according to claim 1, wherein the target-finding radiation is pulsed, and a direction of movement of the target object based on the number of pulses detected during a detection process of the detected target-finding radiation.

12. The surveying system according to claim 1, wherein the speed at which the first change in alignment occurs is adapted dynamically to the movement of the target object.

13. A computer program product which is stored on a non-transitory machine-readable carrier, with program code, which product is suitable for carrying out the method according to claim 1.

14. A surveying system for determining the position of a target point by means of a target object which defines the target point, wherein the surveying device comprises:
a control and evaluation unit with an evaluation, data processing and control functionality;
a base;
an upper part which can pivot about a first axis with respect to the base, the upper part comprising:
a sighting device which defines a target axis and can pivot about a second axis,
a target-finding unit having a first radiation source for generating target-finding radiation,
a means for multi-directional emission of the target-finding radiation into free space, and
a photosensitive line sensor for detecting target-finding radiation reflected by the target object, wherein the reception range of the line sensor is in the form of a reception fan and the target axis is in a defined spatial reference relation with respect to the plane of the reception fan,
a target-fine-sighting unit mounted in a fixed positional relation with respect to the sighting device, the target-fine-sighting unit comprising:
a second radiation source for generating fine-sighting radiation,
a means for emitting the fine-sighting radiation coaxially with respect to the target axis in the form of a radiation cone with a small angle of aperture, and
a photosensitive large-area sensor for detecting fine-sighting radiation reflected by the target object,
wherein the control and evaluation unit is designed to track a target object which moves relative to the surveying device during the target-finding process, such that continuous alternating pivoting of the upper part about the first axis occurs in an oscillating fashion between two reversal points in two opposite pivoting directions under automatic control by the control and evaluation unit in accordance with a defined algorithm and with continuous emission of target-finding radiation, and wherein a respective reversal point is defined dynamically as a function of an alignment of the upper part, at which alignment target-finding radiation reflected by the target object is detected with the line sensor, such that the alignment of the upper part and the target axis tracks the movement tendency of the target object.

15. A method for automatically finding a moving target object which defines a target point, using a surveying device of claim 14, wherein the target object which moves relative to the surveying device is tracked on a continuous basis, wherein:

target-finding radiation is emitted in the form of a transmission fan, and the upper part pivots about the first axis in an alternating fashion in two opposing pivoting directions between the two reversal points, wherein a respective reversal point of the two reversal points is defined dynamically as a function of an alignment of the upper part, at which alignment target-finding radiation reflected by the target object is detected with the line sensor, such that the alignment of the upper part and the target axis track the movement tendency of the target object.

* * * * *